United States Patent [19]

Kitamura et al.

[11] 3,864,152

[45] Feb. 4, 1975

[54] COATED GLASS BOTTLE

[75] Inventors: Shuji Kitamura, Toyonaka; Kimio Horikoshi, Takatsuki, both of Japan

[73] Assignee: Sumitomo Chemical Company, Limited, Osaka, Japan

[22] Filed: May 2, 1973

[21] Appl. No.: 356,450

[30] Foreign Application Priority Data

May 24, 1972 Japan.............................. 47-51841

[52] U.S. Cl........ 117/73, 117/72, 117/94, 117/124 E
[51] Int. Cl.............................................. B65d 23/08
[58] Field of Search............... 117/124 E, 72, 94, 73

[56] References Cited
UNITED STATES PATENTS 3,352,708  11/1967  Lyon et al................... 117/124 E X
3,368,915  2/1962   Carl et al....................... 117/94 X
3,523,100  8/1970   Stein et al.................. 117/124 E X
3,712,829  1/1973   Steigelman................. 117/124 E X

FOREIGN PATENTS OR APPLICATIONS 980,287   1/1965   Great Britain ................ 117/124 E

*Primary Examiner*—Ralph Husack
*Attorney, Agent, or Firm*—Wenderoth, Lind & Ponack

[57] ABSTRACT

The present invention relates to a high pressure resin-coated glass bottle containing a polyvinyl alcohol resin on the surface of the bottle and an alkali-resistant layer on the surface of the polyvinyl alcohol resin. The resin-coated bottles are especially adapted for bottling effervescent or carbonated beverages from a safety standpoint in that if they explode, the resin prevents the bottle fragments from scattering and injuring nearby persons.

4 Claims, No Drawings

COATED GLASS BOTTLE

This invention relates to a resin-coated glass bottle. More particularly, this invention relates to a high pressure glass bottle coated with a resin so that, when the bottle breaks, the fragments of the bottle are prevented from scattering.

As well known, the internal pressure of a bottle for carbonated or effervescent beverage such as cider, cola, beer or the like may reach such pressure as high as about 8 kg./cm$^2$. Such bottle tends to break due to its flow or strain or a quick variation in the ambient temperature and is therefore very dangerous.

An object of the present invention provides a resin-coated glass bottle so that, even when the bottle breaks, the fragments of the bottle are prevented from scattering.

The bottle to be used in the present invention is to contain an effervescent or carbonated beverage or beer or the like and must be able to be repeatedly used. Therefore the bottle must be resistant against an alkali solution to be used in the bottle washing step. In addition, the bottle must be high in such properties as the transparency (appearance) and hardness (flaw prevention). Further, it is necessary to apply a resin coating layer as thin as possible so as to be economically advantageous.

It has already been proposed to coat a glass bottle with a resin mostly for the decoration or protection to prevent the occurrence of flaws in the bottle.

However, in such conventional practice, not only fragments scattering when a high pressure glass bottle breaks can not be prevented but also the above mentioned requirements are not satisfied.

We have found that when the surface of a glass bottle is coated with a polyvinyl alcohol a polyvinyl alcohol resin coating layer is coated further with a highly alkali-resistant resin, the resulting coated bottle can satisfy simultaneously the prevention of the scattering of fragments upon breaking and the above mentioned requirements.

The thickness of the polyvinyl alcohol resin coating layer according to the present invention may vary depending upon the particular shape and internal pressure of the bottle to which the layer is applied. For example, it is desirable to apply a polyvinyl alcohol resin coating of a thickness not less than 100 microns when the bottle has an internal pressure of 3 kg./cm$^2$. Also it is desirable to apply a polyvinyl alcohol resin coating of a thickness not less than 200 microns when the glass bottle has an internal pressure of 8 kg./cm$^2$.

The thickness of the highly alkali-resistant resin coating layer to be applied on the polyvinyl alcohol resin layer is not critical to this invention but is preferably not less than 10 microns in thickness.

Examples of alkali-resistant resins to be applied on the polyvinyl alcohol coating layer include epoxy resins, urethane resins and ethyl-cellulose resins.

The polymerization degree of the polyvinyl alcohol to be used in the present invention is not less than 500. If the polymerization degree is less than 500, the scattering of the broken bottle can not be effectively prevented. A plasticizer such as glycerin or ethylene glycol may be added to the polyvinyl alcohol resin in order to increase the flexibility of the resin and to effectively prevent the scattering of the fragments of the broken bottle.

It is surprising that the fragments of a bottle when it breaks can be effectively prevented from scattering by the provision of such a thin polyvinyl alcohol resin coating of a thickness of about 100 to 200 microns, in view of the fact that even in case other resin such as ethylenevinyl acetate copolymers, polycarbonate resins, MBS (methyl-methacrylate-butadiene-styrene-graft copolymer) resins and cellulosic resins known as tough resins high in the shock-resistance and tear-resistance is applied in order to obtain the same effect as in the present invention, a film having a thickness several times as large as of a resin coating layer of a polyvinyl alcohol is required. Apparently such heavy thick film is disadvantageous to the economy. Further, a coated bottle having such a thick film can not be used in a conventional bottling step.

Any of additives which are usually incorporated into resins such as dyes, pigments and light and heat stabilizers may be added to the resin coating layer of the present invention within a range not adversely affecting the object of the present invention.

The resin-coating of the present invention can be applied by any proper process. For example, a resin coating layer of a predetermined thickness may be formed by dipping, painting or spraying a glass bottle with an aqueous solution of a polyvinyl alcohol. The solution may be added with an alcohol to adjust the evaporating velocity. Further, in order to improve the workability, boric acid or colloid silica may be added to such resin solution. Then the applied resin layer is heat-treated to improve the hot water-resistance of the polyvinyl alcohol. By the above treatment, the scattering of fragments when the bottle breaks can be effectively prevented. However, this alone is insufficient for the alkali-resistance. Therefore, according to this invention, a resin high in the alkali-resistance is further applied on the above mentioned polyvinyl alcohol layer to complete the production of the resin-coated glass bottle of the present invention.

The resin coating high in the alkali-resistance can be easily applied by dipping or spraying with a solution of said resin.

The present invention will be more concretely explained by means of the following examples which however do not limit the scope of the invention.

In these examples, bottle breaking test for investigating the prevention of the scattering of fragments when a bottle is broken has been conducted as follows. Thus the scatter prevention was judged by the scatterability of fragments when a resin-coated glass bottle was filled with a carbonated beverage so as to be of an internal pressure of 8 kg./cm$^2$. and was forcibly broken by projecting a steel ball of 500 g. against it. The alkali-resistance was determined by the appearance variation after an operation of dipping said glass bottle in a 4 % aqueous solution of sodium hydroxide at 70° C. for 10 minutes and then pulling it up was repeated 20 times. Further, the slip was judged by comparing the slip between said bottles with the slip between glass bottles not so coated.

EXAMPLE 1

A 20 % aqueous solution of polyvinyl alcohol (polymerization degree: 1,750) which has been washed with water was prepared and a film about 200 microns in thickness was formed on the surface of a Coca Cola bottle (capacity 500 ml.) by dipping it in said aqueous solution. The resin coating layer was dried by gradually elevating the temperature from 50° to 200° C. while preventing the formation of bubbles, to obtain a transparent and hard tough resin coating layer on the bottle.

Then said resin-coated bottle was dipped in a 10 % ethanol solution of ethyl cellulose and the ethanol was dried, an alkali-resistance resin film about 30 microns in thickness was formed. The resulting resin-coated bottle was transparent and hard and had such slip as of uncoated glass bottle. Even when the alkali-resistance test was conducted, there was observed no appearance variation. In the bottle breaking test, fragment scattering was not observed.

EXAMPLE 2

The procedure of Example 1 was repeated except that an epoxy resin film about 50 microns in thickness was formed by treating a polyvinyl alcohol-coated bottle with an epoxy resin solution (100 parts of product obtained by dehydrochlorination reaction of 1 mole of bisphenol A and 2 moles of epichlorohydrin, 50 parts of heterocyclodiamine and 1,000 parts of ethanol) instead of the alkali-resistant resin film of ethyl cellulose. The resulting resincoated glass bottle was transparent and hard, had such slip as of uncoated glass bottle. There was no variation of the appearance at all even after the alkali-resistance test. The bottle showed no scattering of gragments at all in the bottle breaking test.

EXAMPLE 3

The procedure of Example 1 was repeated except that an alkali-resistant resin film of a urethane resin about 50 microns in thickness was formed by treating a polyvinyl alcohol-coated bottle with a urethane resin solution (220 parts of 75 % ethyl acetate solution of adduct of tolylene diisocyanate and trimethylol propane, 100 parts of adduct of trimethylol propane and propylene oxide and 320 parts of ethyl acetate) instead of the ethyl cellulose film. This resin coated glass bottle was transparent and hard, had such slip as of a glass bottle, had no variation of the appearance even after the alkali-resistance test and showed no scattering of fragments at all in the bottle breaking test.

EXAMPLE 4

A Coca Cola bottle was dipped in a 17 % aqueous solution of polyvinyl alcohol (polymerization degree: 2,400) to form a resin layer of a thickness of about 180 microns thereon. Then the film was dried by gradually elevating the temperature from 50° to 80° C. to form a transparent, hard and tough resin coating.

Then the resin-coated bottle was further coated with a urethane resin solution (185 parts of adduct of tolylene diisocyanate and trimethylol propane, 80 parts of adduct of trimethylolpropane and propylene oxide, 20 parts of polypropyleneglycol (polymerization weight: 1,600), 140 parts of styrene and 3 parts of benzoyl peroxide) and the polyurethane film was hardened at 120° C. for 30 minutes to obtain urethane resin coating of about 100 $\mu$ in thickness.

The resulting resin-coated glass bottle was transparent, hard and had a slippage same as that of uncoated glass bottle. No appearance variation was observed even after the alkali-resistance test. No fragment scattering was observed in the bottle breaking test.

What we claim is:

1. A resin-coated glass bottle which comprises a polyvinyl alcohol resin coating layer of a thickness not less than 100 microns on the surface of the bottle, which polyvinyl alcohol resin has a polymerization degree of not less than 500, and a high alkali-resistant resin coating layer on the said polyvinyl alcohol resin layer, which alkali-resistant resin is selected from the group consisting of an epoxy resin, a urethane resin and an ethyl cellulose resin.

2. A resin-coated glass bottle according to claim 1, wherein the polyvinyl alcohol contains a plasticizer.

3. A resin-coated glass bottle according to claim 2, wherein the plasticizer is glycerin or ethylene glycol.

4. A resin-coated glass bottle according to claim 1 wherein the thickness of the highly alkali-resistant coating layer is not less than 10 microns.

* * * * *